(12) United States Patent
Sundareson et al.

(10) Patent No.: US 12,219,173 B2
(45) Date of Patent: *Feb. 4, 2025

(54) ENCODING OUTPUT FOR STREAMING APPLICATIONS BASED ON CLIENT UPSCALING CAPABILITIES

(71) Applicant: NVIDIA Corporation, Santa Clara, CA (US)

(72) Inventors: Prabindh Sundareson, Karnataka (IN); Sachin Pandhare, Karnataka (IN); Shyam Raikar, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,074

(22) Filed: Nov. 14, 2023

(65) Prior Publication Data

US 2024/0098303 A1 Mar. 21, 2024

Related U.S. Application Data

(63) Continuation of application No. 17/683,140, filed on Feb. 28, 2022, now Pat. No. 11,818,192.

(51) Int. Cl.
*H04N 19/146* (2014.01)
*H04N 19/105* (2014.01)
*H04N 19/59* (2014.01)

(52) U.S. Cl.
CPC ........... *H04N 19/59* (2014.11); *H04N 19/105* (2014.11); *H04N 19/146* (2014.11)

(58) Field of Classification Search
CPC ... H04L 65/756; H04L 65/762; H04L 65/764; H04L 65/765; H04L 67/08
(Continued)

(56) References Cited

U.S. PATENT DOCUMENTS 6,580,754 B1 6/2003 Wan et al.
8,683,542 B1 3/2014 Henry
(Continued)

FOREIGN PATENT DOCUMENTS

CA 2712409 A1 2/2011
CN 114501031 A * 5/2022
(Continued)

OTHER PUBLICATIONS

Sundareson, Prabindh; Non-Final Office Action for U.S. Appl. No. 17/683,140, filed Feb. 28, 2022, mailed Sep. 15, 2022, 15 pgs.
(Continued)

*Primary Examiner* — Khanh Q Dinh
(74) *Attorney, Agent, or Firm* — Taylor English Duma L.L.P.

(57) ABSTRACT

In various examples, the decoding and upscaling capabilities of a client device are analyzed to determine encoding parameters and operations used by a content streaming server to generate encoded video streams. The quality of the upscaled content of the client device may be monitored by the streaming servers such that the encoding parameters may be updated based on the monitored quality. In this way, the encoding operations of one or more streaming servers may be more effectively matched to the decoding and upscaling abilities of one or more client devise such that an increased number of client devices may be served by the streaming servers.

20 Claims, 9 Drawing Sheets

(58) Field of Classification Search
USPC .................................. 709/203, 206, 220, 232
See application file for complete search history.

(56) References Cited

U.S. PATENT DOCUMENTS

| | | | |
|---|---|---|---|
| 9,854,020 B1* | 12/2017 | Kum | H04L 65/752 |
| 10,194,188 B1 | 1/2019 | Kum et al. | |
| 10,856,030 B1 | 12/2020 | Kum et al. | |
| 11,308,637 B2* | 4/2022 | Li | G06V 20/56 |
| 11,818,192 B2* | 11/2023 | Sundareson | H04L 65/80 |
| 11,855,991 B1* | 12/2023 | Jenkins | H04L 12/2816 |
| 11,902,503 B1* | 2/2024 | Valli | H04N 13/312 |
| 2005/0114894 A1 | 5/2005 | Hoerl | |
| 2005/0251834 A1 | 11/2005 | Hulbig | |
| 2007/0109324 A1 | 5/2007 | Lin | |
| 2009/0087120 A1 | 4/2009 | Wei | |
| 2013/0013098 A1 | 1/2013 | Gentile et al. | |
| 2016/0086316 A1 | 3/2016 | Lee et al. | |
| 2016/0212482 A1 | 7/2016 | Balko | |
| 2019/0342555 A1 | 11/2019 | Dimitrov et al. | |
| 2020/0265273 A1* | 8/2020 | Wei | G06N 3/048 |
| 2021/0065712 A1* | 3/2021 | Holm | G10L 15/02 |
| 2021/0129019 A1 | 5/2021 | Colenbrander | |
| 2021/0233210 A1 | 7/2021 | Elron et al. | |
| 2021/0295148 A1* | 9/2021 | Gonsalves | G06N 3/045 |
| 2022/0374714 A1* | 11/2022 | Nayak | G06T 1/20 |
| 2022/0417467 A1* | 12/2022 | Roeder | H04N 21/23805 |
| 2023/0275950 A1 | 8/2023 | Sundareson et al. | |

FOREIGN PATENT DOCUMENTS

| | | | | |
|---|---|---|---|---|
| DE | 102021128623 A1 | | 5/2022 | |
| EP | 3846478 A1 * | | 7/2021 | G06N 3/045 |

OTHER PUBLICATIONS

Sundareson, Prabindh; Final Office Action for U.S. Appl. No. 17/683,140, filed Feb. 28, 2022, mailed Jan. 3, 2023, 17 pgs.
Sundareson, et al.; Notice of Allowance for U.S. Appl. No. 17/683,140, filed Feb. 28, 2022, mailed Jun. 20, 2023, 16 pgs.
"Automatically Adjust Quality when streaming", Plex Support, Retrieved from Internet URL: https://support.plex.tv/articles/115007570148-automatically-adjust-quality-when-streaming/, accessed Mar. 7, 2022, last modified Jan. 5, 2022, 23 pgs.
"Microsoft Stream (Classic) Video delivery and network overview", Microsoft Stream | Microsoft Docs, Retrieved from Internet URL: https://docs.microsoft.com/en-US/stream/network-overview, accessed on Mar. 7, 2022, (Feb. 26, 2022), 9 pgs.
Aaron, et al.; "Per-Title Encode Optimization," By Netflix Technology Blog | Netflix TechBlog, Retrieved from Internet URL: https://netflixtechblog.com/per-title-encode-optimization-7e99442b62a2, accessed Mar. 7, 2022, (Dec. 14, 2015), 13 pgs.

* cited by examiner

US 12,219,173 B2

ENCODING OUTPUT FOR STREAMING APPLICATIONS BASED ON CLIENT UPSCALING CAPABILITIES

CROSS-REFERENCE TO RELATED APPLICATIONS

This application is a Continuation of U.S. patent application Ser. No. 17/683,140, filed Feb. 28, 2022, which is hereby incorporated by reference in its entirety.

BACKGROUND

Providing cloud-hosted applications as a service is an extremely complex endeavor, and involves maintaining a balance between gaming and network performance—ideally without impacting the user experience. Streaming systems may encode video data of an application on the server side with the decoding of the video data and rendering of video frames occurring on the client side for display on a client device. Conventionally, in order to reduce or control the latency and packet loss of a streaming system or resource usage in streaming servers (e.g., the amount of compute resources used to encode and stream a video to a client device), streaming systems may downscale or reduce the resolution of the stream that is encoded.

Reducing the resolution of streamed content may improve the performance of a streaming server. For example, reducing the resolution of a streamed video from 1080P to 720P may reduce the computing resources a streaming server needs to encode the video data and the network resources needed to transmit the video data. Some conventional streaming systems may consider the supported monitor resolution of the client device when choosing an appropriate resolution in order to reduce the resolution of the streamed video. However, reducing the resolution of a streamed application may cause the video frames rendered by the client device to be of substantially lower visual quality, particularly if the client device lacks software and/or hardware capable of adequately decoding and rendering the received video data.

SUMMARY

Embodiments of the present disclosure relate to video encoding in multi-client streaming systems based on video upscaling capabilities. Systems and methods are disclosed that determine encoding parameters for streaming video content to target devices based on the decoding and upscaling capabilities and/or performance of the target client devices. Further, systems and methods are disclosed that can orchestrate and/or balance the streaming of content to multiple target devices from a plurality of streaming servers based on the various capabilities of the target devices, such that more devices may be served.

In contrast to conventional approaches, such as those described above, disclosed approaches may consider the upscaling capabilities of one or more client devices when determining one or more encoding parameters (e.g., video stream resolution, bitrate) associated with a video stream, such as a game stream or an output stream for a user interface of a cloud-hosted application. By determining or configuring the one or more encoding parameters based at least on the upscaling capabilities of particular client devices, disclosed approaches may account for the visual quality of video frames rendered at the client devices. Thus, graphical and/or other output content may be streamed to a client device(s) with minimal or no reduction in perceived quality while reducing the use of computing and network resources. In at least one embodiment, the streaming servers may serve (e.g., provide or host content streamed to) one or more additional clients based at least on adjusting the one or more encoding parameters.

BRIEF DESCRIPTION OF THE DRAWINGS

The present systems and methods for video encoding in streaming systems and applications based on video upscaling capabilities are described in detail below with reference to the attached drawing figures, wherein.

DETAILED DESCRIPTION

Figure 1:
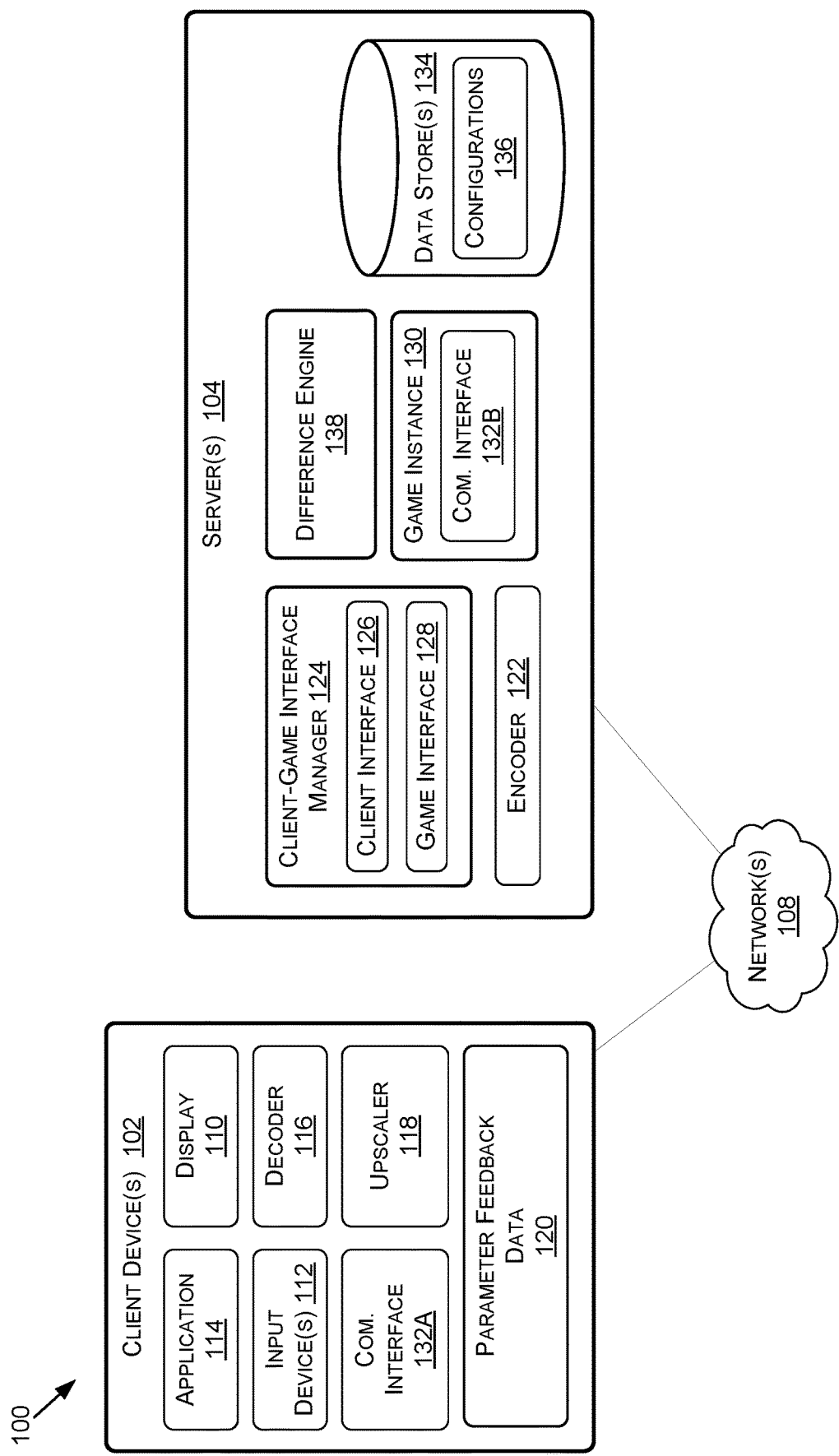
FIG. 1 is an example system diagram of a streaming system, in accordance with at least some embodiments of the present disclosure.

Systems and methods are disclosed related to video encoding in multi-client streaming systems based on video upscaling capabilities.

In contrast to conventional approaches, such as those described above, disclosed approaches may consider the upscaling capabilities of one or more client devices when determining one or more encoding parameters (e.g., video stream resolution, bitrate, compression, etc.) associated with a video stream, such as a game stream or a stream of a graphical user interface of a cloud-hosted application. In one or more examples, the cloud-hosted application may correspond to a dashboard for an application implemented using one or more neural networks, a conversational artificial intelligence application, a simulation or testing application, a collaborative content creation application, or a platform for multiple, heterogeneous applications. By determining or configuring the one or more encoding parameters based at least on the upscaling capabilities of the client devices, disclosed approaches may account for the visual quality of video frames rendered at the one or more particular client devices. Thus, output content (e.g., graphical, audio, haptic, or other output) may be streamed with little or no loss in perceived quality to a client device(s). By considering the capabilities of the client devices when selecting encoding parameters with which to stream content, the utilization of computing and network resources may be reduced. It at least one embodiment, the streaming servers may serve one or more additional clients based at least on adjusting the one or more encoding parameters. For example, by reducing the resolution, bitrate, or other encoding parameter(s) of content streamed to a client device, additional resources may become available on a streaming server allowing for other client devices to be served by the streaming server.

In various examples, the upscaling capabilities of a particular client device may be determined prior to determining and/or adjusting one or more encoding parameters that define how data (e.g., video, audio, haptic, etc.) is encoded and streamed to the client device. Determining the upscaling capabilities may include, for example, determining the client device is capable of performing one or more types of upscaling, performing upscaling at one or more quality levels, and/or performing upscaling to one or more display resolutions. For example, client devices with enhanced processing resources, such as those provided by a graphics processing unit (GPU), may be able to use high quality upscaling to render video data that is streamed at a lower resolution. Some client devices may be capable of upscaling that is aided by artificial intelligence or machine learning models. For example, a high quality upscaler may be implemented using a Deep Learning based Convolutional Neural Network (CNN). In one or more embodiments, the high quality upscaler may be trained at least partially using a discriminator and/or a Generative Adversarial Network (GAN).

In some embodiments, based at least on the determined upscaling capabilities of a client device, the streaming server(s) may reduce and/or set the resolution of the streamed video data. For example, the upscaling capabilities may indicate the client device is capable of upscaling the reduced resolution stream to provide frames with an acceptable quality for display or other presentation using the client device. In some examples, an upscaling algorithm used by the client device may be used to determine an upscaling ratio or the upscaling ratio may be otherwise indicated to the streaming server(s). The upscaling ratio may be used to determine, at least in part, the one or more resolutions that are compatible with the upscaling algorithm. In some examples, a maximum resolution threshold for the streamed content may be determined based on the upscaling abilities of a client device. For example, if it is determined that a particular client device is capable of a 1:1.5 upscaling ratio, the resolution of the streamed video data may be reduced based at least on the upscaler being capable of upscaling the new resolution by 1.5× to a supported and/or current display resolution of the client device.

In one or more embodiments, the encoding parameters may be determined to account for the type of content or certain characteristics of the streamed video content. For example, content with a particular characteristic may influence the effectiveness of a particular encoding/decoding algorithm (e.g., speed and/or complexity of encoding/decoding). For instance, an encoding algorithm that may be efficient for streaming gaming visuals that has a simplified color set (e.g., cartoon style, cel-shaded, etc.) may not be an optimal algorithm when applied to streamed output data associated with an application with a wider color palate and dynamic range (e.g., games with dark colors, shadows, etc.). Similarly, some encoding algorithms may be suited to fast paced games (e.g., where low-latency is prioritized and where lag and/or jitter is highly undesirable) but may not be optimal for slower paced applications where another algorithm may provide better performance.

In some embodiments, the type and/or characteristics of the streamed content may be considered in combination with or separately from the upscaling capabilities of the recipient client device when configuring stream parameters such as streamed quality. In at least one embodiment, the server may determine the type of upscaling that can provide a high quality rendering on a client device based at least on the type of content or characteristics thereof. Also, in at least one embodiment, the server may maintain a table of bitrate requirements for each genre and/or type of game or content. The table may define a maximum streaming bitrate requirement for a given quality.

The server may use the table to determine an output bitrate in determining updates to the one or more encoding parameters for one or more client devices. Using this approach, the server may adapt to the number of clients that can be catered to with optimum quality even if the network bandwidth is low. In one or more embodiments, a feedback loop may be provided to collect and provide to the streaming server information about the upscaled video data. For example, the feedback loop may provide information that may be used to determine the quality of the upscaled video periodically, continuously, based at least on a request from the server, based at least on an event such as a switch to a new resolution, etc. The information may be based at least on a comparison between one or more frames of the upscaled video and the original quality video (e.g., source image data) and/or previous resolution video.

In some embodiments, a difference engine may be used by a streaming system to determine the difference in the quality between the video data. For example, a difference engine may determine one or more peak signal-to-noise ratio (PSNR) values indicating any deviation in quality from the original streamed and/or rendered video. The streaming system may use the information provided by the feedback loop to determine whether to and/or how much to set, adjust, or otherwise configure one or more encoding parameters to account for any changes to the quality of the streamed game at the client device. For example, streaming resolution may be increased based at least on a PSNR value(s) falling below a threshold value(s). Additionally or alternatively, based at least on the PSNR value(s) being above the threshold value(s) the resolution may be maintained or reduced.

In further respects, the disclosure provides for one or more streaming servers performing load balancing based at least on the capabilities of one or more client devices that are served or are to be served by the one or more streaming servers. For example, a streaming server may determine the one or more encoding parameters, at least in part, to reduce the use of its compute resources by reducing the resolution of the streamed video data. Reducing the use of compute resources may free up resources that can be used to serve one or more additional client devices. Additionally, one or more client devices may be assigned to streaming servers based at least on the encoding algorithm determined to be optimal for a particular streaming session. For example, based at least on the encoding parameters chosen in association with particular client devices and streamed content, the client devices may be assigned across streaming servers—that may vary in configuration—and may enable a streaming system to service an increased number of client devices or reduce to the total number of active servers required in the streaming system. In some embodiments, the feedback with respect to the client devices may be used to facilitate the load balancing operations.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is an example system diagram of a streaming system 100 (also referred to as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 may include, among other things, one or more client devices 102, one or more servers 104, and one or more network(s) 108. Although one client device 102 is illustrated in FIG. 1, this is not intended to be limiting. In examples, there may be any number of client devices 102. The system 100 (and the components and/or features thereof) may be implemented using one or more computing devices, such as the computing device 800 of FIG. 8, described in more detail below.

The client device(s) 102 may include an application 114, a communication interface 132A, an input device(s) 112, a decoder 116, an upscaler 118, a feedback data 120, and/or a display 110. Although only a few components and/or features of the client device(s) 102 are illustrated in FIG. 1, this is not intended to be limiting. For example, the client device(s) 102 may comprise additional or alternative components, such as those described below with respect to the computing device 800 of FIG. 8.

The server(s) 104 may include, among other things, a client-game interface manager 124, a game (application) instance 130 (or "game 130"), a difference engine 138, and/or a data store(s) 134. Although only a few components and/or features of the server(s) 104 are illustrated in FIG. 1, this is not intended to be limiting. For example, the server(s) 104 may comprise additional or alternative components, such as those described below with respect to the computing device 800 of FIG. 8 and/or the data center 900 of FIG. 9.

As an overview, the client-game interface manager 124 of the server 104 may include a client interface 126 and/or a game (application) interface 128. The client interface 126 and the game interface 128 may be configured to manage communications via any number of network(s) 108, described herein. For example, the client-game interface manager 124 may use the client interface 126 to communicate with the application 114 of the client device(s) 102 and/or the game interface 128 to communicate with the game instance 130 of the server(s) 104.

In some examples, the game interface 128 may be configured to receive video data from the game instance 130. In some examples, the game interface 128 may be configured to encode the video data associated with game play from the game instance 130 using the encoder 122. The client interface 126 may be configured to transmit the encoded video data to the client device 102. In some examples, the client device(s) 102 may use an Ethernet or Wi-Fi connection through a router to access the Internet in order to communicate with the server(s) 104 through the client-game interface manager 124.

The encoder 122 may include one or more components and features for encoding game data for streaming to client device(s) 102. Encoding may be performed according to any of a number of encoding parameters. One of more of the encoding parameters may define a resolution for which video data may be encoded. In some embodiments, the encoder 122 may encode video data to a resolution that is selected such that it encoded to be less than a maximum resolution supported by an upscaling algorithm and/or display resolution of the client device(s) 102. For example, a ratio of the encoded streaming resolution may be determined by comparing the resolution of the output display to the minimum resolution supported by the upscaling algorithms available to the client device(s) 102.

In at least one embodiment, the server 104 may select encoding parameters based on the type of content or characteristics of the content that is streamed to the client device(s) 102. The server 104 may use a table of bitrates, or other requirements or recommendations for each genre and/or type of game or content that is streamed. For example, the data store(s) 134 may store one or more configurations 136 that define the tables that may indicate a maximum and/or minimum streaming bitrate and/or other parameters for streaming content to produce a given quality of the content at the client device(s) 102. The data store(s) 134 may store updates to the one or more encoding parameters in the configurations 136.

The difference engine 138 may include one or more components and features for determining or analyzing the quality of the upscaled video data generated by the client device(s) 102. For example, the difference engine 138 may receive information from the feedback data 120 (e.g., one or more upscaled video frames) to determine the quality of the upscaled video data compared to the source video data generated by the game instance 130. By comparing the source video data from the server(s) 103 to the output video data of the client device(s) 102, encoding parameters may be modified to optimize or otherwise adjust the encoding parameters used to encode the video. In some embodiments, based on the level of quality of the upscaled video data determined using the difference engine 138, the encoding parameters used by the encoder 122 may be modified upon initialization of a video stream and/or during a currently transmitted video stream. In some embodiments, the difference engine 138 may determine one or more peak signal-to-noise ratio (PSNR) values indicating any deviation in quality from the original streamed and/or rendered video (e.g., corresponding to the level of quality). The server(s) 104 may use the information from the difference engine 138 and/or the feedback data 120 to determine whether to and/or how much to set, adjust, or otherwise configure one or more encoding parameters for the video stream. Although determining a PSNR in the difference engine 138 value is described, it is not intended to be limiting, and any suitable calculation and/or metric for quality is contemplated herein. Further, while the difference engine 138 is shown on the server(s) 104, in at least one embodiment the difference engine 138 may be included at least partially on the client device(s) 102.

In at least one embodiment, the feedback data 120 may indicate to the server(s) 104 that the display resolution has been modified and that the resolution of the streamed content may need to be adjusted accordingly. For example, the client device(s) 102 may switch from a 1440p to a 2160p monitor display which may cause the feedback data 120 to indicate to the server(s) 104 that a higher resolution video stream may need to be streamed to that particular client device to accommodate the increased output resolution without detectable drops in video quality.

Components of the system 100 may communicate over a network(s) 108. The network(s) 108 may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the system 100 may communicate with one or more of the other components via one or more of the network(s) 108.

The client device(s) 102 may include a smart phone, a laptop computer, a tablet computer, a desktop computer, a wearable device, a game console, a virtual reality system (e.g., a headset, a computer, a game console, remote(s), controller(s), and/or other components), an NVIDIA SHIELD, a smart-home device that may include an intelligent personal assistant (e.g., an AMAZON ECHO, a GOOGLE HOME, etc.), and/or another type of device capable of supporting streaming of video and/or audio.

The application 114 may be a mobile application, a computer application, a console application, a web browser application, a video streaming platform application, and/or another type of application or service. In some embodiments, multiple applications 114 may be employed. In one or more embodiments, the application 114 may include instructions that, when executed by a processor(s), cause the processor(s) to, without limitation, receive input data representative of user inputs to the one or more input device(s) 112, transmit the input data to the server(s) 104, in response receive a video stream from the client-game interface manager 124 using the communication interface 132A, and cause display of the video on the display 110. In other words, the application 114 may operate as a facilitator for enabling streaming of video of gameplay or other content associated with the application 114 on the client device(s) 102.

In one or more embodiments, the client device(s) 102 may use the application 114 to display gameplay video or other video content on the display 110. In examples where the display data is received by the client device(s) 102, the system 100 may be part of a game streaming system, such as the content streaming system 700 of FIG. 7, described in more detail below.

The display 110 may include any type of display capable of displaying the video (e.g., a light-emitting diode display (LED), an organic LED display (OLED), a liquid crystal display (LCD), an active matrix OLED display (AMOLED), a quantum dot display (QDD), a plasma display, a virtual monitor, an LED/LCD display, and/or another type of display). In some examples, the display 110 may include more than one display (e.g., a dual-monitor display for computer gaming, a first display for configuring a game and a virtual reality display for playing the game, etc.). In some examples, the display 110 is a touch-screen display, such as a touch-screen of a smart phone, tablet computer, laptop computer, or the like, where the touch-screen includes at least one of the input device(s) 112 of the client device(s) 102.

The input device(s) 112 may include any type of devices that are capable of providing user inputs to the game 130. The input device(s) may include a keyboard, a mouse, a touch-screen display, a controller(s), a remote(s), a headset (e.g., sensors of a virtual reality headset), and/or other types of input devices.

The communication interfaces such as the communication interface 132A and the communication interface 132B (referred to collectively or individually herein as "communication interface(s) 132") may include one or more components and features for communicating across one or more networks, such as the network(s) 108. The communication interface(s) 132 may be configured to communicate via any number of the network(s) 108, described herein. For example, to communicate in the system 100 of FIG. 1, the client device(s) 102 may use an Ethernet or Wi-Fi connection through a router to access the Internet in order to communicate with the server(s) 104, and/or with other client device(s) 102. In at least one embodiment, the game interface 128 and/or the client interface 126 may act as an intermediary between the communication interfaces 132.

Figure 2:
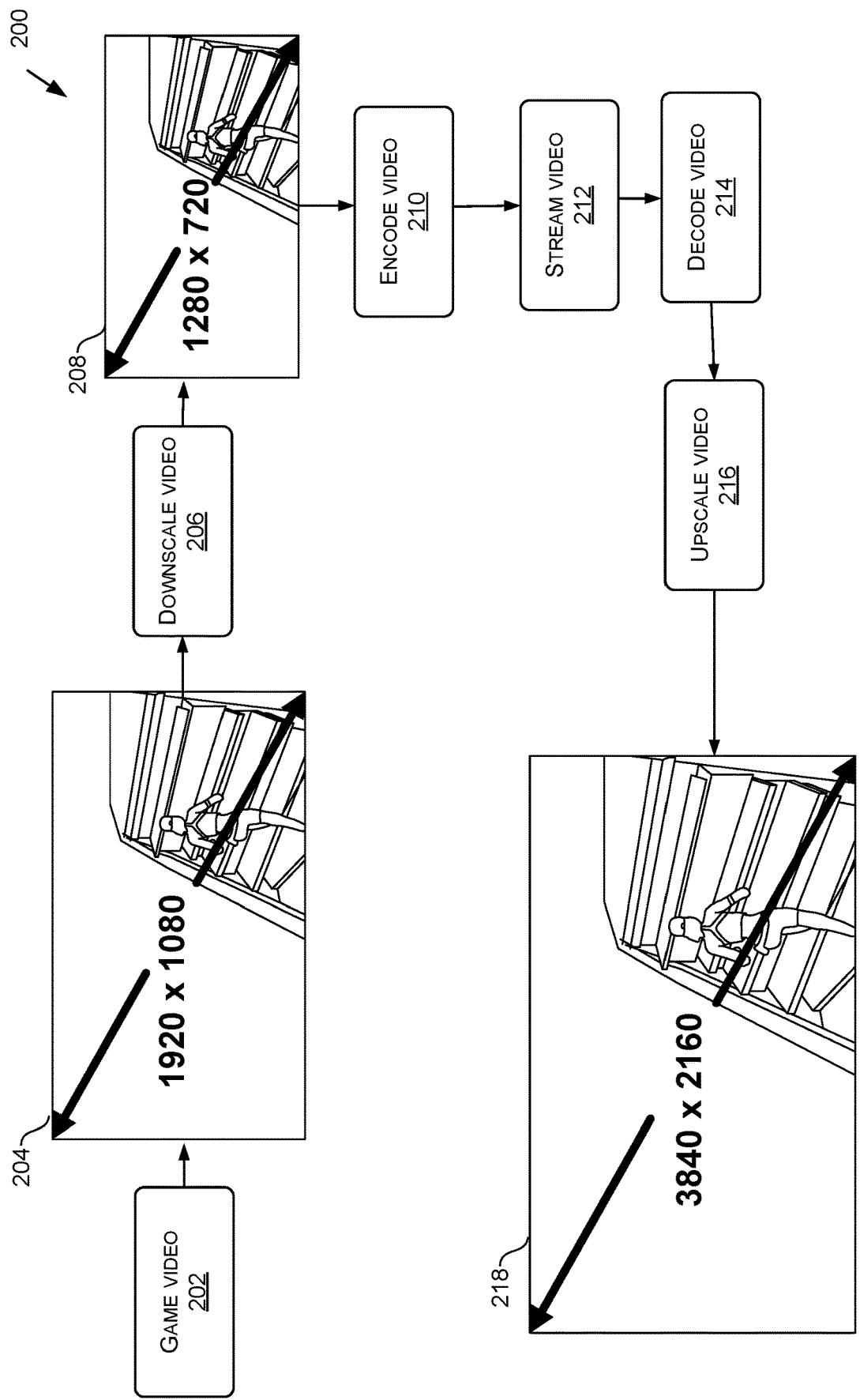
FIG. 2 is a flow diagram showing a stream encoding and decoding process, in accordance with at least some embodiments of the present disclosure.

Now referring to FIG. 2, FIG. 2 is flow diagram showing a stream encoding and decoding process 200, in accordance with at least some embodiments of the present disclosure. The stream encoding and decoding process 200 may be implemented on the system 100 of FIG. 1. For example, the encoder 122 and decoder 116 may be used in the process 200 to stream and display video data. The stream encoding and decoding process 200 may be associated with game (application) video 202, which may be generated by the game instance 130 of FIG. 1. The game video 202 may include video data representing frames associated with gameplay video or graphical, audio, haptic, or other output of the game 130 or application. The game video 202 may be represented using a source resolution 204. The source resolution 204 may be the native, default, and/or configured video resolution for video data generated by the game instance 130. For example, the source resolution for a particular game instance on the server 104 may be a resolution of 1920×1080 pixels for each frame of the video.

The game video 202 that is of the source resolution 204 may be downscaled to a lower resolution (e.g., by the encoder 122 according to one or more of the encoding parameters). The downscaled video 206 may be represented in a downscaled resolution 208. The downscaled resolution

208 may reduce the size and bitrate needed to encode the game video 202 compared to the source resolution 204. For example, the downscaled resolution 208 may reduce the source resolution 204 of 1920×1080 pixels to a resolution of 1280×720 pixels.

The process 200 may generate encoded video 210 using an encoder, such as the encoder 122. For example, the downscaled video 206 may be encoded to be compatible with a streaming format, destination, codec, and/or any other parameter for streaming video data. The encoded video 210 may be streamed as streamed video 212 (e.g., using the client interface 126). For example, the server(s) 104 may transmit the streamed video 212 to one or more client devices 102. Once the one or more client devices 102 receive the streamed video 212, they may generate the decoded video 214 (e.g., using the decoder 116). The decoded video 214 may be upscaled (e.g., using the upscaler 118), using an upscaling algorithm to generate upscaled video 216.

In some embodiments, the upscaled video 216 may be represented in an upscaled resolution 218. The upscaled resolution 218 may be a resolution that is greater than the downscaled resolution 208. In some embodiments, the upscaled resolution 218 may be a resolution that is greater or equal to the source resolution 204. For example, an upscaled resolution of 3840×2160 pixels may be greater than a source resolution of 1920×1080 pixels generated by the server(s) 104.

Figure 3:
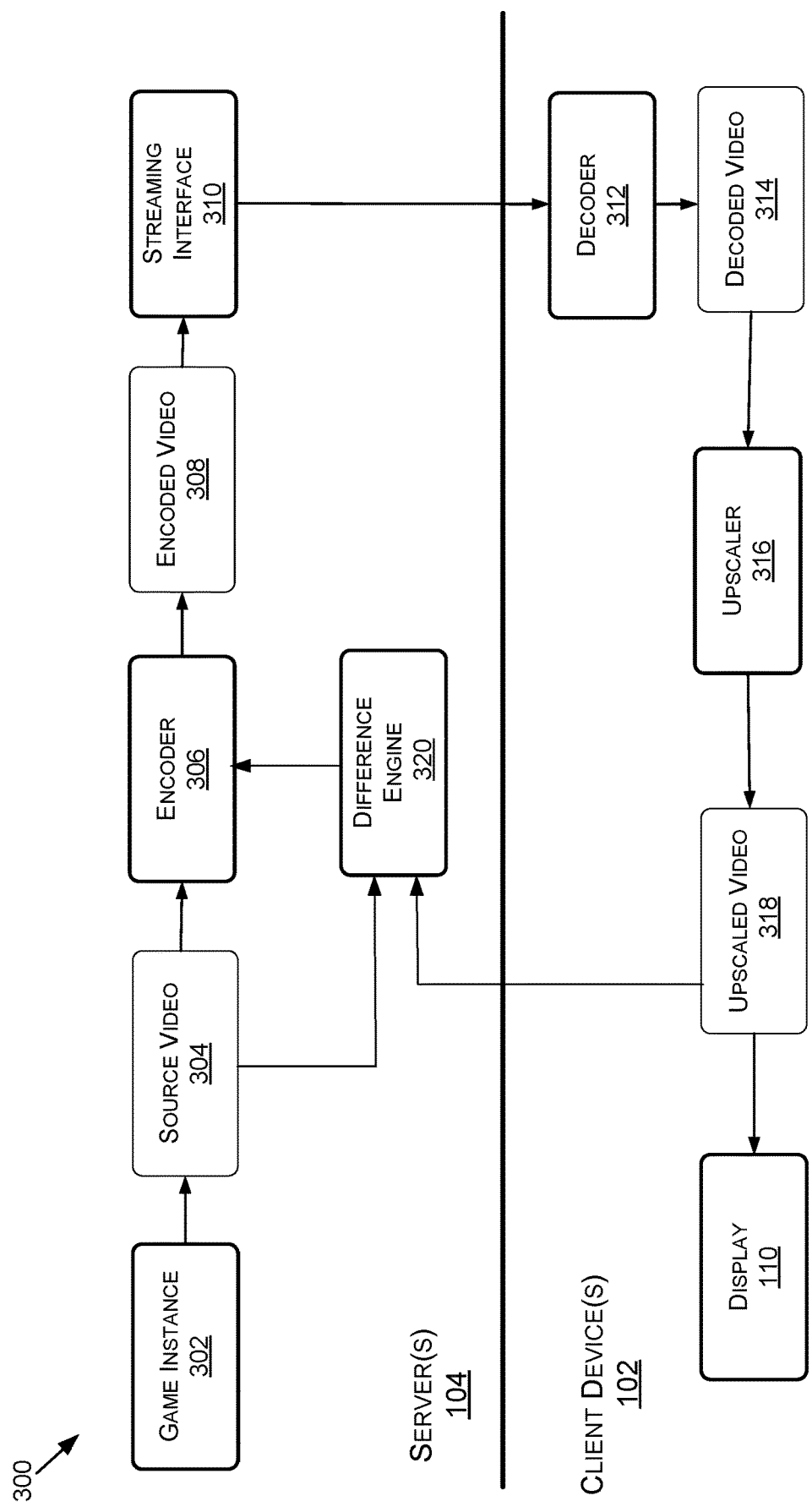
FIG. 3 is an example block diagram of a video streaming process, in accordance with at least some embodiments of the present disclosure.

Now referring to FIG. 3, FIG. 3 is a block diagram of a video streaming process 300, in accordance with at least some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The video streaming process 300 may include, among other things, a game instance 302. The game instance 302 (e.g., the game instance 130) may be associated with a game streaming session and may provide one or more streams of video data content such a stream corresponding to source video 304 (e.g., RGBA video). The source video 304 may be represented in a source resolution.

The source video 304 may be received by an encoder 306 (e.g., the encoder 122). The encoder 306 may encode the source video 304 in accordance with encoding parameters that may be determined to account for the decoding and/or upscaling capabilities of the client device(s) 102. One or more of the upscaling capabilities may be configured and/or indicated by a client and/or user of a client device 102 (e.g., via data transmitted by the client device 102). As further examples, one or more of the upscaling capabilities may be determined by the server 104 (e.g., based at least on analyzing data from the client device 102, such as one or more upscaled video frames, identified or indicated hardware capabilities or configurations, etc.).

Examples of upscaling capabilities include the client device being capable of performing one or more types of upscaling, performing upscaling at one or more quality levels, and/or performing upscaling to one or more display resolutions. For example, client devices with enhanced processing resources, such as those provided by a graphics processing unit (GPU), may be able to use high quality upscaling to render video data that is streamed at a lower resolution. Some client devices may be capable of upscaling that is aided by artificial intelligence or machine learning models. For example, a high quality upscaler may be implemented using a Deep Learning based Convolutional Neural Network (CNN). Where the client device is capable of high quality upscaling, the server 104 may reduce the encoded video resolution and/or select a lower video resolution for encoding. In contrast, where the client device is not capable of high quality upscaling and/or uses lower quality upscaling, such as Lanczos or Bilinear filters, the server 104 may increase the encoded video resolution and/or select a higher video resolution for encoding.

In at least one embodiment, an upscaling algorithm may require a stream resolution R, that is less than the ratio Rmax=(R.DISPLAY/Rmin), where Rmin is the minimum resolution supported by the algorithm and R.DISPLAY is the display resolution. The server 104 may determine one or more encoding parameters based at least on this ratio (e.g., to satisfy this ratio). For example, the server 104 may ensure R<Rmax. For example, some high quality upscaling algorithms may only support input resolutions below a minimum threshold (e.g., where they only support fixed upscaling ratios). In this case, the server 104 may ensure that the resolution of the stream does not cross above that threshold, so that the client device 102 can apply the upscaler 316. This condition may be maintained throughout the streaming session. Maintaining this condition may present a loss of rendering quality due to frequent change-over from high quality to low quality modes of upscaling (e.g., in a worst-case, on frame-frame basis).

Where a high quality upscaler is not supported due an unsupported ratio, when the user changes a display monitor to a higher resolution monitor (e.g., to 3840×2160 from 1920×1080), the client device 102 may dynamically change the upscaler 316 to use the higher quality upscaler, and maintain it throughout the remaining session. This is because the upscaling ratio may become supported due to the monitor change.

In at least one embodiment, the client device 102 (e.g., a user) may choose a particular resolution below which the stream resolution should not be streamed at. The client device 102 may also choose not to participate in the server load balancing. The server 104 may take this into account when determining whether to and/or how much to reduce video resolution.

In some embodiments, the type of content or one or more characteristics of the streamed video content may be considered by the server 104 when selecting or determining the particular encoding parameters and/or algorithms to use to generate encoded video 308. In some embodiments, a feedback loop may be used to measure and/or monitor the quality of upscaled video 318 of the client device(s) 102 that is generated from the encoded video 308. In some examples where a feedback loop is used, a difference engine 320 (e.g., the difference engine 138) may receive one or more frames and/or portions thereof from the upscaled video 318 and/or other data indicating video quality values from the client device(s) 102. For example, the difference engine 320 may compare one or more corresponding frames and/or portions of the source video 304 to one or more portions of the upscaled video 318. Based on comparing the source video 304 to the upscaled video 318, the difference engine 320 may calculate a visual quality level value and/or score, such as a PSNR value. Based on the quality determined by the difference engine 320, the server 104 may change the encoding operations used to generate the encoded video 308. In at least one embodiment, if the visual quality level (e.g., the PSNR) falls below a threshold, the streaming resolution may be increased on the server 104. In at least one embodiment, when one or more frames are included in the feedback, the one or more frames may be compressed (e.g., losslessly) and transmitted to the server 104.

In at least one embodiment, the server 104 may use one or more client and/or user configurable parameters to determine one or more of the encoding parameters. Examples include a minimum stream resolution, a minimum quality level, a minimum bitrate, and/or an algorithm or type of algorithm to be used for upscaling (e.g., AI-enhanced, Lanczos, Linear, etc.). In at least one embodiment, the server 104 may use one or more server parameters to determine one or more of the encoding parameters. Examples include a minimum stream resolution upscaling capability of a client device 102, the type of content being streamed, additional client requests for streaming (e.g., in a pending queue). In at least one embodiment, based at least on a client device 102 joining streaming, the server 104 may determine the upscaling capabilities and populate the client and/or server parameters accordingly. Based at least on one or more client requests being pending in the queue, the server 104 may scan through the parameters and determine one or more new resolutions for one or more of the client devices 102.

Once the encoded video 308 has been generated, it may be transmitted from the server(s) 104 to the client device(s) 102 using the streaming interface 310 that is configured to transmit one or more streams of content to the one or more client devices 102. When the encoded video 308 is received by the client device(s) 102, it may be decoded using a decoder 312 (e.g., the decoder 116). The decoder 312 may be configured to use one or more decoding algorithms that are capable of decoding the encoded video 308 that has been encoded by the encoder 306 using an encoding algorithm. That is, the decoder 312 may use a decoding algorithm that corresponds to the encoding algorithm used by the encoder 306. By using a decoding algorithm, the decoder 312 may decode the encoded video 308 to generate decoded video 314.

Once the decoder 312 has generated the decoded video 314, the decoded video 314 may be upscaled using an upscaler 316 (e.g., the upscaler 118). The upscaler 316 may use one or more upscaling algorithms, such as AI upscaling algorithms that may be executed using one or more hardware GPUs. For example, the upscaler 316 may invoke a GPU-based upscaling algorithm and/or process to upscale the decoded video 314 to generate the upscaled video 318. In at least one embodiment, the upscaled video 318 may be of a higher resolution (e.g., 2160p) than the decoded video 314 and/or the source video 304. In at least one embodiment, the upscaled video may be of an equal or lesser resolution than the decoded video 314 and/or the source video 304.

In at least one embodiment, the upscaled video 318 may be output to the display 110 of the client device(s) 102. In at least one embodiment, one or more portions of the upscaled video 318 may be provided to the server(s) 104 (e.g., to the difference engine 320) via a feedback loop, as indicated in FIG. 3. For example, the upscaled video 318 may be compared to the source video 304 by the difference engine 320 to update and/or evaluate the encoding processes.

Figure 4:
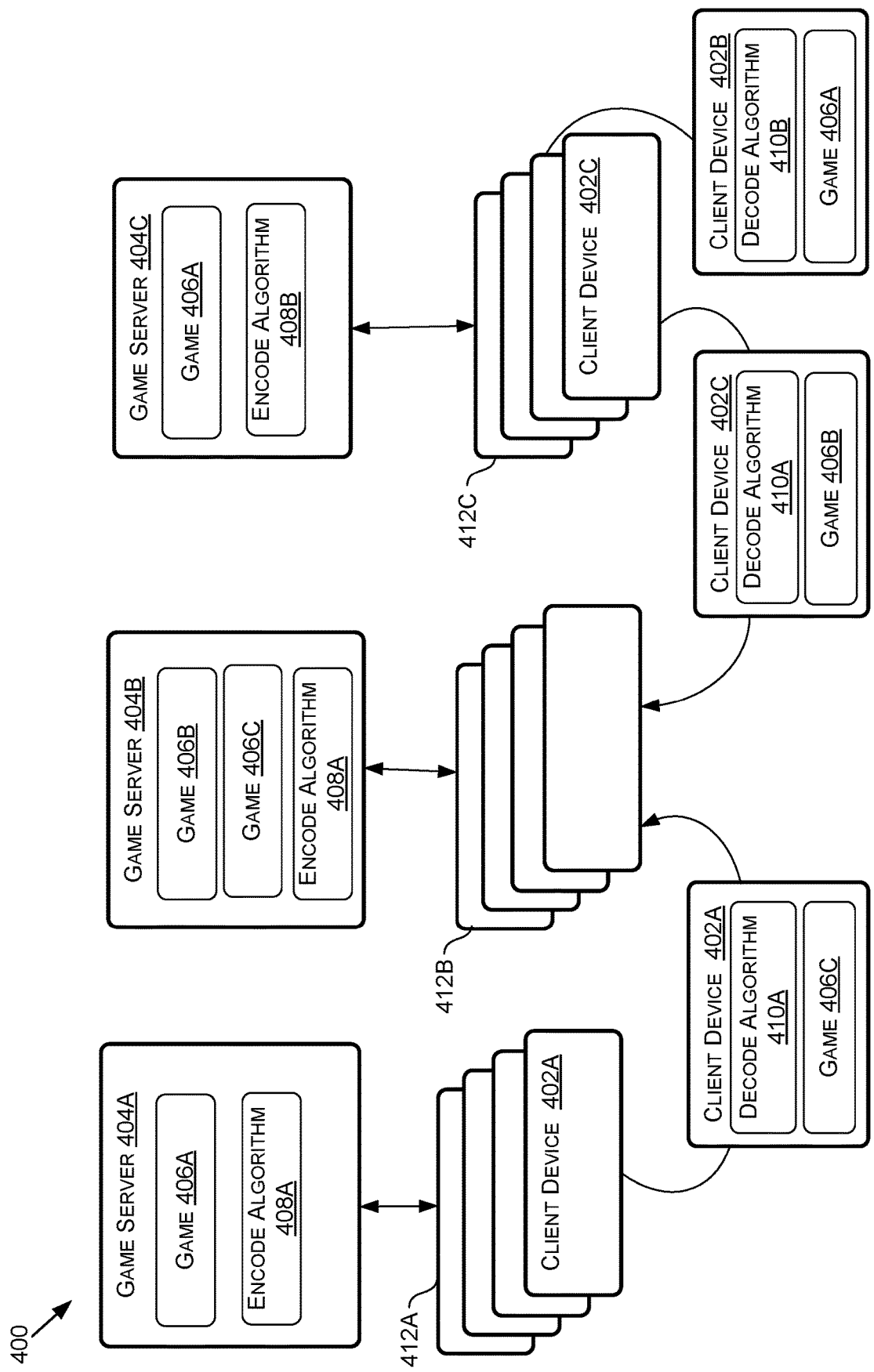
FIG. 4 is a diagram of an example load balancing process for use in a streaming system, in accordance with at least some embodiments of the present disclosure.

Now referring to FIG. 4, FIG. 4 is a diagram of an example load balancing process 400 in a streaming system, in accordance with at least some embodiments of the present disclosure. The process 400 may include one or more client devices such as a client device 402A, a client device 402B, and a client device 402C (referred to collectively as the "client devices 402"). The client devices 402 may be connected to, or otherwise communicating with one or more game (application) servers such as a game server 404A, a game server 404B, and a game server 404C (referred to collectively as the "game servers 404"). In some embodiments, the game servers 404 may be associated with one or more games such as a game 406A, a game 406B, and a game 406C (referred to collectively as the "games 406"). In at least one embodiment, the games 406 may refer to game instances of the same game or different games. In at least one embodiment, the game servers 404 may be configured to operate using one or more encoding algorithms such as an encode algorithm 408A and an encode algorithm 408B (referred to collectively as the "encode algorithms 408"). In at least one embodiment, the client devices 402 may be configured to operate using one or more decoding algorithms such as a decode algorithm 410A and a decode algorithm 410B (referred to collectively as the "decode algorithms 410").

In the example depicted in FIG. 4, the client device 402A is initially in a set 412A of one or more client devices served by the game server 404A. In such an example, it may be determined that client device 402A may be better served by the game server 404B since the client device 402A is running the game 406C that is also associated with the game server 404B. In this example, the client device 402A may be transferred from the game server 404A to the game server 404B so that the client device 402A may be included in a set 412B of client devices served by the game server 404B.

In another example depicted in FIG. 4, the client device 402C is initially in a set 412C of one or more client devices served by the game server 404C. In such an example, it may be determined that the client device 402C may be more efficiently served by the game server 404B since the client device 402C is running the game 406B that is associated with the game server 404B and/or uses the decode algorithm 410A that corresponds to the encode algorithm 408A used by the game server 404B. Matching the client device to the game server based the particular game and/or decoder of the client device may allow for an optimized assignment of client devices to game servers. In this example, the client device 402C may be transferred, or otherwise assigned, from the game server 404C to the game server 404B so that client device 402C may be included in the set 412B of client devices served by the game server 404B.

In at least one embodiment, a game server 404 may serve n-number clients at the same time. When one or more conditions are satisfied, such as one or more demand metrics are determined to exceed a threshold, the game server 404 may perform one or more load balancing operations. In at least one embodiment, the game server 404 may scan the upscaling capabilities of the client devices 402 that are connected to the game server 404. If the game server 404 determines a client device 402 is capable of high quality upscaling (and/or based on the type of supported upscaling and/or supported upscaling capabilities), the game server 404 may reduce the encode resolution to a value compatible with the high quality upscaling. Reducing the resolution may reduce the load on the game server 404, allowing for additional client devices 402 to be served. If the game server 404 determines one or more other hosted client devices 402 have upscaling capabilities that satisfy one or more criteria for lowering the resolution, the game server 404 may do so for one or more of those client devices 402 as well.

As described herein, whether a client device 402 can provide high quality upscaling may be determined based at least on the type of content or certain characteristics of the streamed video content (e.g., in combination of the upscaler supported by the client device 402). For example, some upscaler may vary in quality for fast motion scenes, dark scenes, when many edges are on screen, or for natural vs artificial scenes. In one or more embodiments, the game server 404 may use the table of bitrates described herein.

Figure 5:
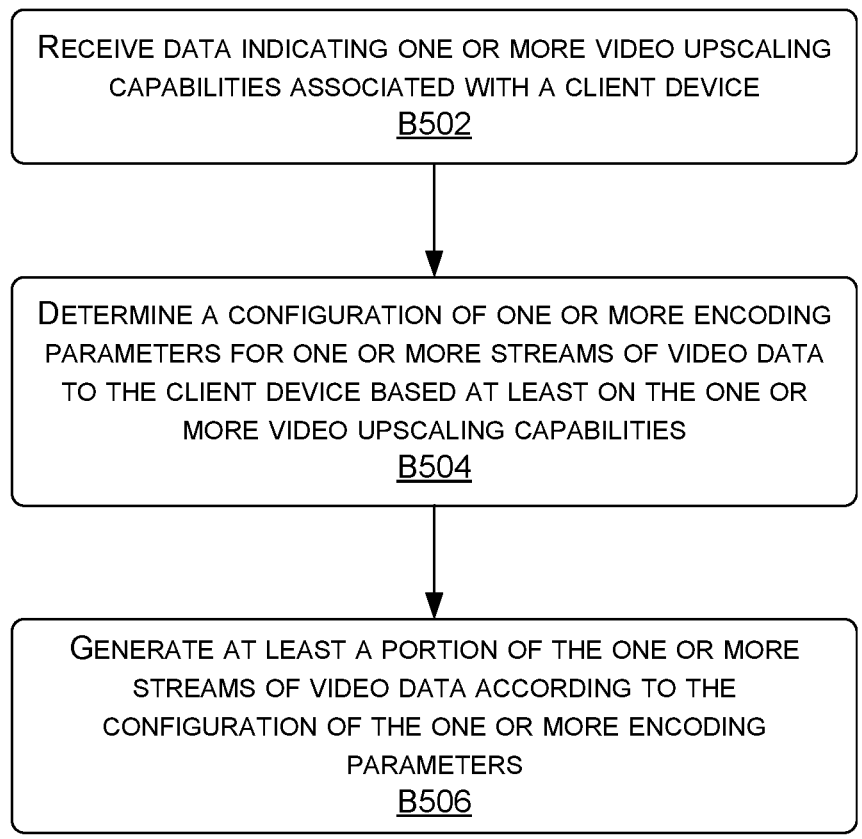
FIG. 5 is a flow diagram showing an example of a method for video encoding in streaming systems based at least on upscaling capabilities, in accordance with at least some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 500 is described, by way of example, with respect to the system of FIG. 1. However, this method may additionally or alternatively be executed by any one system, or any combination of systems, including, but not limited to, those described herein.

FIG. 5 is a flow diagram showing an example of a method for video encoding in streaming systems based at least on upscaling capabilities, in accordance with some embodiments of the present disclosure. The method 500, at block B502, includes receiving data indicating one or more video upscaling capabilities associated with a client device. For example, the server(s) 104 may receive data via the client-game interface manager 124 that indicates capabilities of the upscaler 118 of the client device(s) 102.

The method 500, at block B504, includes determining a configuration of one or more encoding parameters for one or more streams of video data to the client device based at least on the one or more video upscaling capabilities and a display resolution associated with the client device. For example, based at least on the data indicating upscaling capabilities received from the client device(s) 102, the client-game interface manager 124 may determine encoding parameters for the encoder 122 to apply.

The method 500, at block B506, includes generating at least a portion of the one or more streams of video data according to the configuration of the one or more encoding parameters. For example, the server(s) 104 may generate video data streams using the encoder 122 and according to the encoding parameters.

Figure 6:
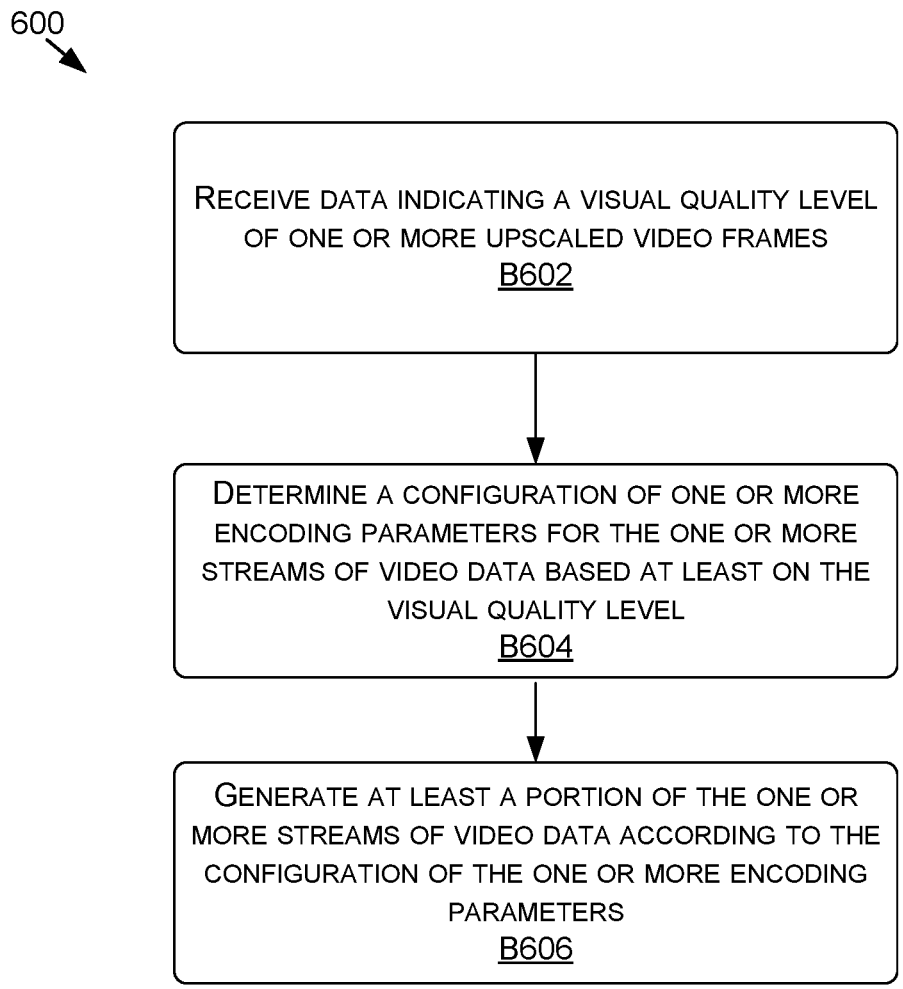
FIG. 6 is a flow diagram showing an example of a method for video encoding in streaming systems based at least on a visual quality level associated with upscaling, in accordance with at least some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 600 is described, by way of example, with respect to the system of FIG. 1. However, this method may additionally or alternatively be executed by any one system, or any combination of systems, including, but not limited to, those described herein.

FIG. 6 is a flow diagram showing an example of a method for video encoding in streaming systems based at least on a visual quality level associated with upscaling, in accordance with some embodiments of the present disclosure. The method 600, at block B602, includes receiving data indicating a visual quality level of one or more upscaled video frames. For example, the difference engine 138 of the server(s) 104 may receive data associated with upscaled video data and corresponding to the feedback data 120 from the client device(s) 102.

The method 600, at block B604, includes determining a configuration of one or more encoding parameters for the one or more streams of video data based at least on the visual quality level. For example, based at least on the data received by the difference engine 138 from the client device(s) 102, the server 104 (e.g., the client-game interface manager 124) may determine encoding parameters and/or configurations to employ.

The method 600, at block B606, includes generating at least a portion of the one or more streams of video data according to the configuration of the one or more encoding parameters. For example, the encoder 122 may generate one or more encoded video data streams according to the determined encoding parameters.

Example Content Streaming System

Figure 7:
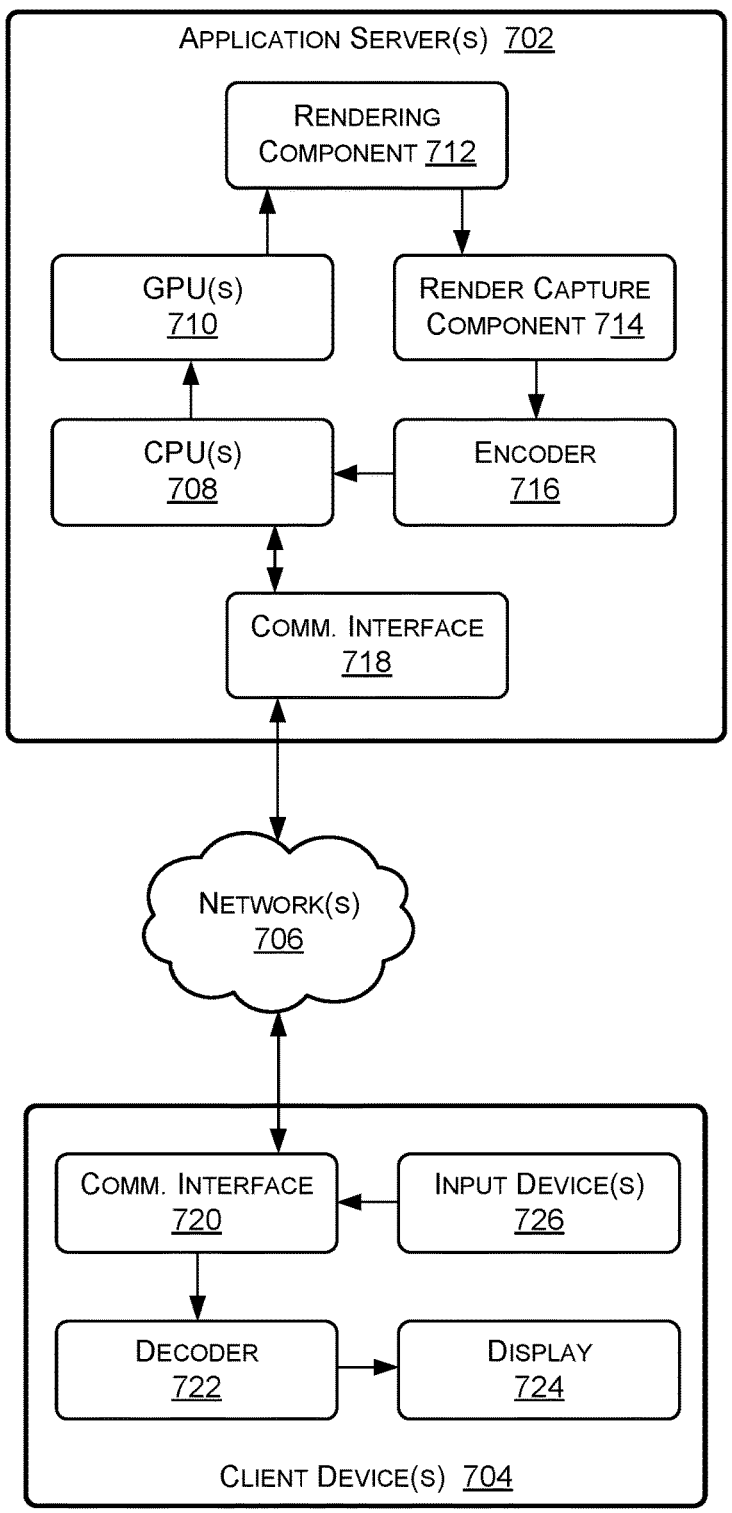
FIG. 7 is a block diagram of an example content streaming system suitable for use in implementing some embodiments of the present disclosure.

Now referring to FIG. 7, FIG. 7 is an example system diagram for a content streaming system 700, in accordance with some embodiments of the present disclosure. FIG. 7 includes application server(s) 702 (which may include similar components, features, and/or functionality to the example computing device 800 of FIG. 8), client device(s) 704 (which may include similar components, features, and/or functionality to the example computing device 800 of FIG. 8), and network(s) 706 (which may be similar to the network(s) described herein). In some embodiments of the present disclosure, the system 700 may be implemented. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, a collaborative content creation application, a simulation application, a deep learning application, and/or other application types or platforms that include heterogeneous application types.

In the system 700, for an application session, the client device(s) 704 may only receive input data in response to inputs to the input device(s), transmit the input data to the application server(s) 702, receive encoded display data from the application server(s) 702, and display the display data on the display 724. As such, the more computationally intense computing and processing is offloaded to the application server(s) 702 (e.g., rendering—in particular ray or path tracing—for graphical output of the application session is executed by the GPU(s) of the game server(s) 702). In other words, the application session is streamed to the client device(s) 704 from the application server(s) 702, thereby reducing the requirements of the client device(s) 704 for graphics processing and rendering.

For example, with respect to an instantiation of an application session, a client device 704 may be displaying a frame of the application session on the display 724 based on receiving the display data from the application server(s) 702. The client device 704 may receive an input to one of the input device(s) and generate input data in response. The client device 704 may transmit the input data to the application server(s) 702 via the communication interface 720 and over the network(s) 706 (e.g., the Internet), and the application server(s) 702 may receive the input data via the communication interface 718. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 712 may render the application session (e.g., representative of the result of the input data) and the render capture component 714 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 702. In some embodiments, one or more virtual machines (VMs)—e.g., including one or more virtual components, such as vGPUs, vCPUs, etc.—may be used by the application server(s) 702 to support the application sessions. The encoder 716 may then encode the display data to generate encoded display data and the encoded display data may be transmitted to the client device 704 over the network(s) 706 via the communication interface 718. The client device 704 may receive the encoded display data via the communication interface 720 and the decoder 722 may decode the encoded display data to generate the display data. The client device 704 may then display the display data via the display 724.

Example Computing Device

Figure 8:
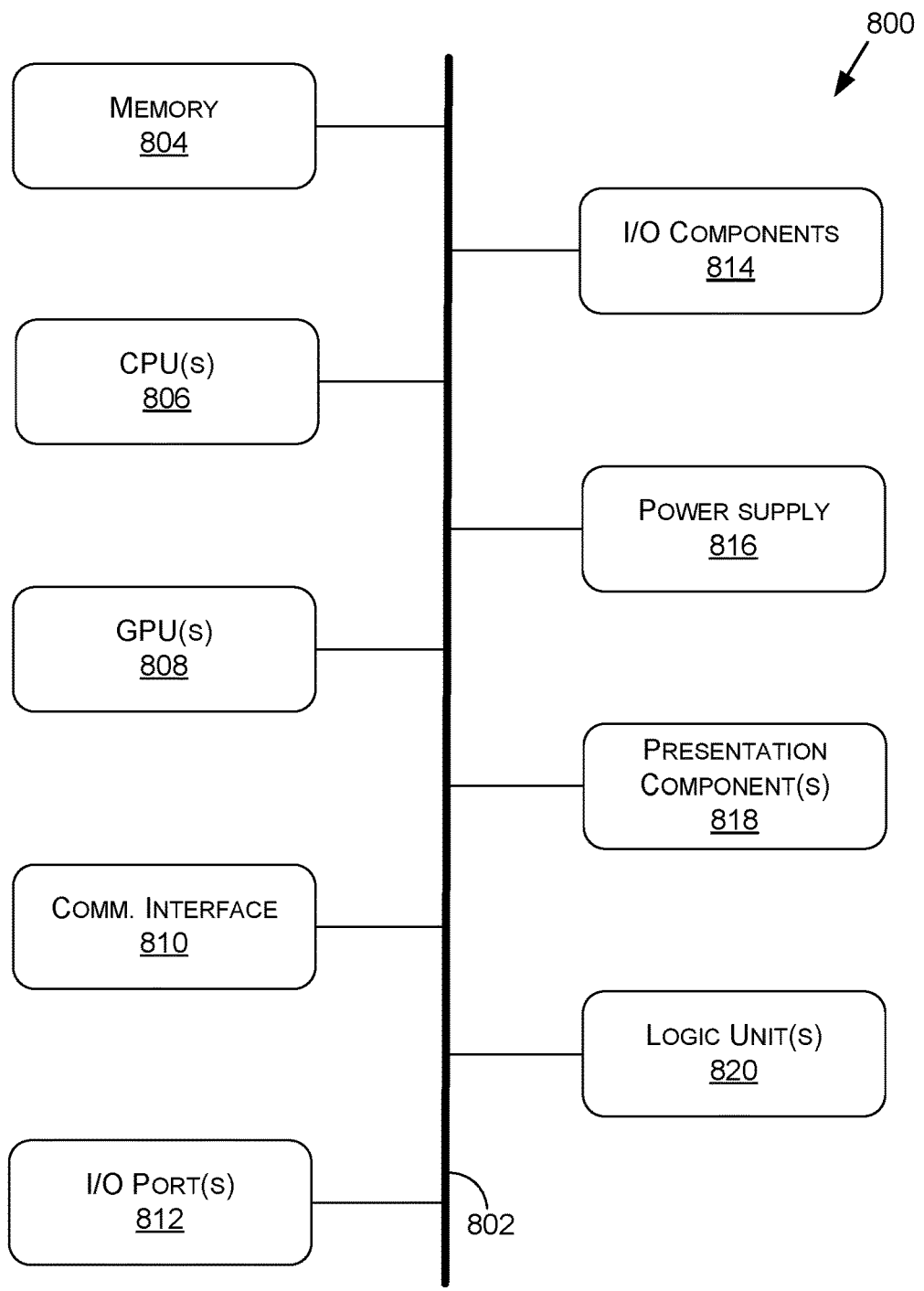
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise on e or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
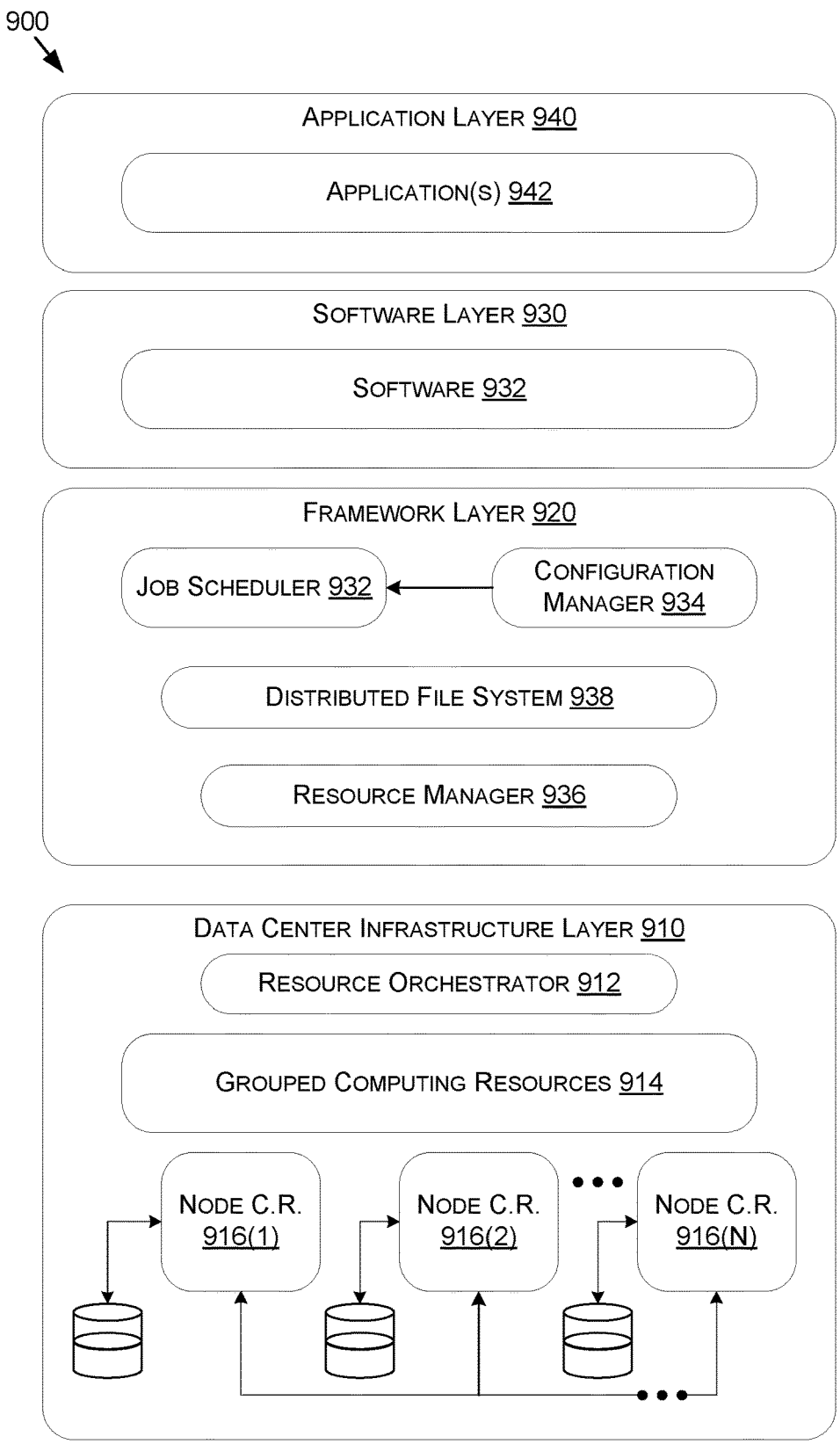
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 932, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
receiving, from a client device, feedback data corresponding to one or more upscaled versions of one or more first encoded frames transmitted using one or more streams of video data to the client device, the feedback data being generated using the client device, wherein the one or more first encoded frames are generated by applying one or more encoding parameters to one or more video frames;
determining, using the feedback data, one or more indicators of visual quality of the one or more upscaled versions of the one or more first encoded frames relative to the one or more video frames, the one or more indicators of visual quality corresponding to a level of visual similarity between the one or more upscaled versions of the one or more first encoded frames and the one or more video frames;
determining, based at least on the one or more indicators of visual quality, one or more updated encoding parameters comprising at least one updated parameter value corresponding to at least one encoding parameter of the one or more encoding parameters; and
transmitting one or more second encoded frames in the one or more streams of video data to the client device to cause the client device to generate one or more upscaled versions of the one or more second encoded frames, the one or more second encoded frames being encoded using the one or more updated encoding parameters.

2. The method of claim 1, wherein the feedback data includes one or more portions of the one or more upscaled versions of the one or more first encoded frames, and
the determining the one or more indicators of visual quality includes comparing the one or more portions of the one or more upscaled versions of the one or more first encoded frames to one or more corresponding portions of the one or more video frames.

3. The method of claim 1, wherein the applying the one or more encoding parameters includes downscaling the one or more video frames to a first resolution indicated by the one or more encoding parameters to generate the one or more first encoded frames having the first resolution, and
wherein the one or more updated encoding parameters indicate a second resolution for the one or more second encoded frames based at least on the one or more indicators of visual quality.

4. The method of claim 1, wherein the one or more streams of video data include one or more streams of output frames from an executing application instance, wherein the one or more video frames are included in the output frames.

5. The method of claim 1, further comprising, based at least on the determining the one or more updated encoding parameters, applying the one or more updated encoding parameters to one or more second video frames to generate the one or more second encoded frames.

6. The method of claim 1, wherein the one or more updated encoding parameters control a frame resolution for the one or more streams of video data.

7. A system comprising:
one or more processing units to execute operations including:
receiving, from a client device, feedback data corresponding to one or more upscaled versions of one or more first frames, the one or more first frames being decoded and upscaled using the client device and based on one or more streams of video data;
determining, using the feedback data, one or more indicators of visual quality of the one or more upscaled versions of the one or more first frames relative to one or more video frames used to generate the one or more first frames, the one or more indicators of visual quality corresponding to a level of visual similarity between the one or more upscaled versions of the one or more first frames and the one or more video frames;
selecting one or more encoding parameters based at least on the one or more indicators of visual quality; and
generating one or more second frames encoded using the one or more encoding parameters.

8. The system of claim 7, wherein the feedback data includes one or more portions of the one or more upscaled versions of the one or more first frames, and
the determining the one or more indicators of visual quality includes comparing the one or more portions of the one or more upscaled versions of the one or more first frames to one or more corresponding portions of the one or more video frames.

9. The system of claim 7, wherein the one or more first frames have a first resolution prior to being upscaled using the client device, and
the one or more encoding parameters define a second resolution for the one or more second frames based at least on the one or more indicators of visual quality.

10. The system of claim 7, wherein the one or more streams of video data include one or more streams of output frames from an executing application instance, the one or more video frames included in the output frames.

11. The system of claim 7, wherein the operations further include, based at least on the selecting the one or more encoding parameters, applying the one or more encoding parameters to one or more second video frames to generate the one or more second frames.

12. The system of claim 7, wherein the one or more encoding parameters control a frame resolution for the one or more streams of video data.

13. The system of claim 7, wherein the system is comprised in at least one of:
a control system for an autonomous or semi-autonomous machine;
a perception system for an autonomous or semi-autonomous machine;
a system for performing simulation operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

14. A processor comprising:
one or more circuits to generate one or more encoded frames in one or more streams of video data using one or more encoding parameters, the one or more encoding parameters based at least on one or more indicators of visual quality, the one or more indicators of visual quality determined based at least on:
- receiving, from a client device, feedback data corresponding to one or more upscaled versions of one or more frames decoded and upscaled from the one or more streams of video data using the client device; and
- comparing, using the feedback data, the one or more upscaled versions of the one or more frames to one or more video frames used to generate the one or more frames, wherein the one or more indicators of visual quality correspond to a level of visual similarity between the one or more upscaled versions of the one or more frames and the one or more video frames.

15. The processor of claim 14, wherein the feedback data includes one or more portions of the one or more upscaled versions of the one or more frames.

16. The processor of claim 14, wherein the one or more frames have a first resolution prior to being upscaled using the client device, and
the one or more encoding parameters define a second resolution for the one or more encoded frames based at least on the one or more indicators of visual quality.

17. The processor of claim 14, wherein the one or more streams of video data include one or more streams of output frames from an executing application instance, the one or more video frames included in the output frames.

18. The processor of claim 14, wherein the one or more circuits are further to, based at least on the one or more encoding parameters, apply the one or more encoding parameters to one or more second video frames to generate the one or more encoded frames.

19. The processor of claim 14, wherein the one or more encoding parameters control a frame resolution for the one or more streams of video data.

20. The processor of claim 14, wherein the processor is comprised in at least one of:
- a control system for an autonomous or semi-autonomous machine;
- a perception system for an autonomous or semi-autonomous machine;
- a system for performing simulation operations;
- a system for performing light transport simulation;
- a system for performing collaborative content creation for 3D assets;
- a system for performing deep learning operations;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

* * * * *